(12) United States Patent
El-Barbari et al.

(10) Patent No.: US 8,907,525 B2
(45) Date of Patent: Dec. 9, 2014

(54) METHOD AND SYSTEM FOR ISLANDING DETECTION AND PROTECTION

(75) Inventors: Said Farouk Said El-Barbari, Freising (DE); Simon Herbert Schramm, München (DE); Ara Panosyan, Munich (DE)

(73) Assignee: General Electric Company, Niskayuna, NY (US)

( * ) Notice: Subject to any disclaimer, the term of this patent is extended or adjusted under 35 U.S.C. 154(b) by 536 days.

(21) Appl. No.: 13/325,246

(22) Filed: Dec. 14, 2011

(65) Prior Publication Data
US 2013/0155734 A1 Jun. 20, 2013

(51) Int. Cl.
*H02H 7/122* (2006.01)

(52) U.S. Cl.
CPC .................................. *H02H 7/122* (2013.01)
USPC ...................................................... 307/102

(58) Field of Classification Search
CPC ...................................................... H02H 7/122
USPC ...................................................... 307/102
See application file for complete search history.

(56) References Cited

U.S. PATENT DOCUMENTS

| | | | |
|---|---|---|---|
| 6,429,546 B1 | 8/2002 | Ropp et al. | |
| 6,810,339 B2 * | 10/2004 | Wills | 702/65 |
| 7,408,268 B1 | 8/2008 | Nocentini et al. | |
| 7,843,082 B2 * | 11/2010 | Chou et al. | 307/64 |
| 7,945,413 B2 | 5/2011 | Krein | |
| 8,334,618 B2 * | 12/2012 | Bhavaraju et al. | 307/86 |
| 8,681,515 B2 * | 3/2014 | Bae et al. | 363/36 |
| 2008/0204044 A1 | 8/2008 | Ponnaluri et al. | |
| 2010/0157634 A1 | 6/2010 | Yu et al. | |
| 2010/0185336 A1 | 7/2010 | Rovnyak et al. | |
| 2011/0115301 A1 | 5/2011 | Bhavaraju et al. | |

OTHER PUBLICATIONS

Pigazo et al., "Wavelet-Based Islanding Detection in Grid-Connected PV Systems", Industrial Electronics, IEEE Transactions, vol. 56 Issue 11, pp. 4445-4455, Nov. 2009.
Liserre et al., "An Anti-Islanding Method for Single-Phase Inverters Based on a Grid Voltage Sensorless Control", Industrial Electronics, IEEE Transactions, vol. 53 Issue 5, pp. 1418-1426, Oct. 2006.
Yafaoui et al., "Improved Active Frequency Drift Anti-Islanding Method with Lower Total Harmonic Distortion", IECON 2010—36th Annual Conference on IEEE Industrial Electronics, ISBN 978-1-4244-5225-5, pp. 3216-3221, Nov. 7-10, 2010.
Mylène et al., "Islanding Detection Method for a Hybrid Renewable Energy System", International Journal of Renewable Energy Research, vol. 1, Issue No. 1, pp. 41-53, 2011.
"Smart Anti-Islanding Using Synchrophasor Measurements", PV Powered, 2010; pp. 1-2.
Jin Beom Jeong et al.; "A Novel Method for Anti-Islanding using Reactive Power"; This paper appears in: Telecommunications Conference, 2005. INTELEC '05. Twenty-Seventh International; Issue Date: Sep. 2005; pp. 101-106.

* cited by examiner

*Primary Examiner* — Hal Kaplan
(74) *Attorney, Agent, or Firm* — Ann M. Agosti

(57) ABSTRACT

A method and system for detecting an islanding condition in a grid is provided. The method comprises detecting a potential islanding condition in a grid; and, in response to the detected potential islanding condition, ramping up an amount of reactive power, active power, or a combination of active and reactive power that is generated from a power conversion system until the earlier of the power conversion system shutting down or a threshold condition being reached.

19 Claims, 5 Drawing Sheets

METHOD AND SYSTEM FOR ISLANDING DETECTION AND PROTECTION

BACKGROUND

This invention relates generally to renewable power generation and more specifically to detection of islanding for a power generation facility connected to a grid. The system and method are particularly applicable to solar, wind, and other renewable power generation systems.

Renewable energy sources such as solar energy sources, wind energy sources, and hydrokinetic energy sources have increasingly penetrated the power generation space in recent years. One challenge in feeding the power generated by renewable energy sources to the grid is islanding, which refers to a condition in which a renewable energy source continues to feed power even though the electric utility (grid) is no longer coupled to the energy source. The detection of an islanding condition is important for safety and grid stability.

A number of passive and active methods for islanding detection have been proposed. Many of these methods either have longer than desirable detection times or fail to detect all islanding conditions.

In one example of an active method of islanding detection using reactive power, a small amount of reactive power is continuously fed by the power conversion system and causes the power conversion system to be shut down upon an islanding condition. In this example, injecting a higher amount of reactive power results in shorter detection period with higher power conversion losses, whereas injecting a lower amount of reactive power results in lower losses but a longer detection period. Hence low losses and short detection time requirements appear contradictory.

Accordingly, a technique is needed to detect an islanding condition with reasonable speed and acceptable power.

BRIEF DESCRIPTION

In accordance with one embodiment disclosed herein, a method of detecting an islanding condition in a grid is provided. The method comprises detecting a potential islanding condition in a grid and, in response to the detected potential islanding condition, ramping up an amount of reactive power, active power, or a combination of active and reactive power that is generated from a power conversion system until the earlier of the power conversion system shutting down or a threshold condition being reached.

In accordance with another embodiment disclosed herein, a grid protection system is provided. The grid protection system comprises a detection unit for detecting a potential islanding condition in a grid; and a variable ramp rate generation unit for, upon detection of a potential islanding condition, ramping up an amount of reactive power, active power, or a combination of active and reactive power that is generated from a power conversion system until the earlier of the power conversion system shutting down or a threshold condition being reached.

In accordance with another embodiment disclosed herein, a solar power generation system is provided. The solar power generation system comprises a solar power conversion system, a detection unit for measuring a line parameter value and using the line parameter value for identifying a potential islanding condition in a grid fed by the solar power conversion system; and a variable ramp rate generation unit for ramping up an amount of reactive power, active power, or a combination of active and reactive power generated from the solar power conversion system in response to an identified potential islanding condition.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

Embodiments disclosed herein relate generally to a system and method for detecting an islanding condition of a grid which is fed by a power conversion system. The term "power conversion system" as used herein may include any suitable power conversion configuration. For example, for solar applications, the power conversion system will typically comprise either a dual or two stage system with a DC-to-DC power converter coupled to a DC-to-AC inverter at a DC link or a single stage DC-to-AC inverter. For wind and hydrokinetic applications, for example, the power conversion system will typically comprise either a dual or two stage system with an AC-to-DC power converter coupled to a DC-to-AC inverter at a DC link or a single stage AC-to-AC converter.

Figure 1:
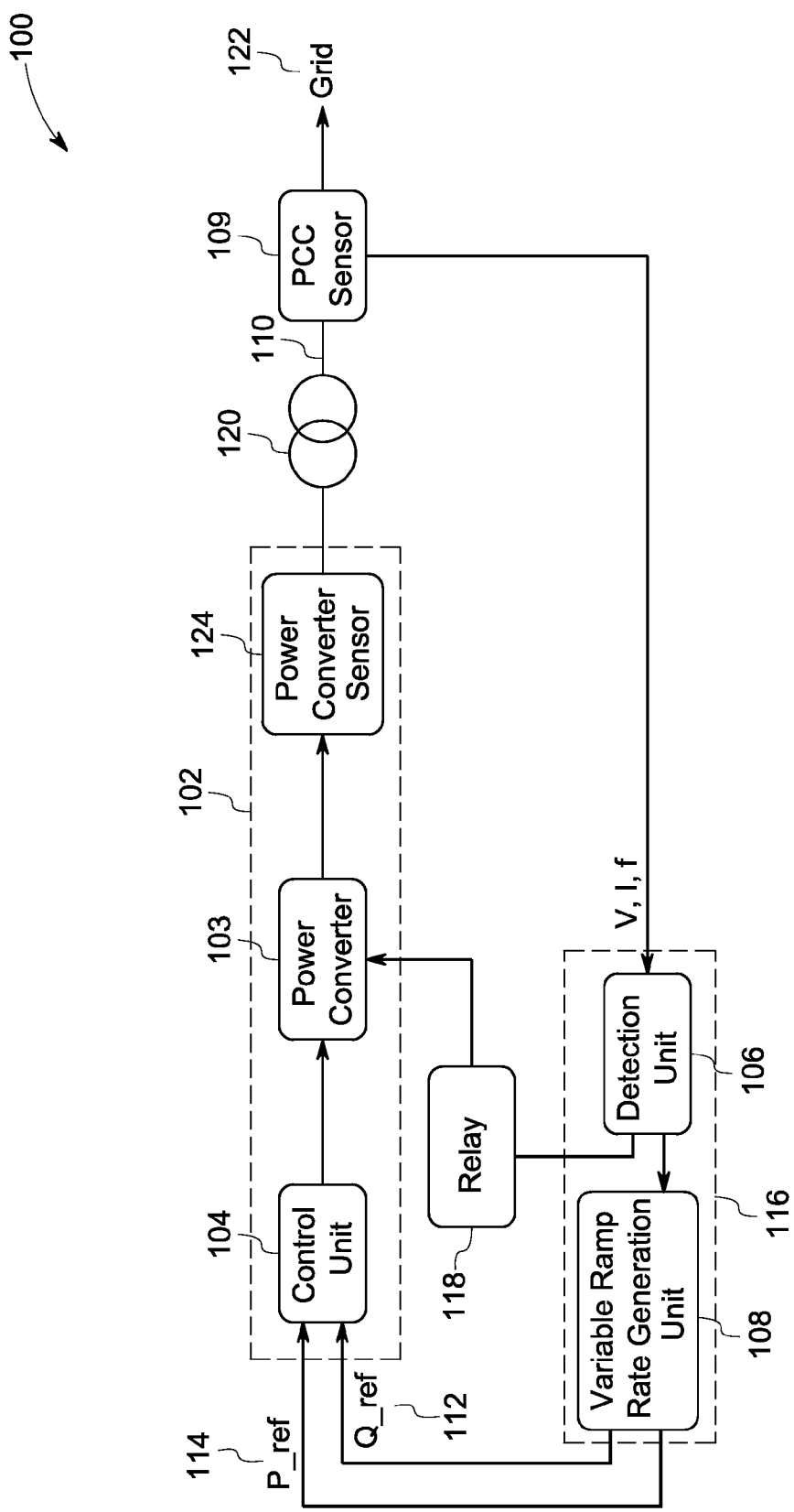
FIG. 1 is a block diagram representation of an exemplary embodiment of a system with a single power conversion system according to aspects of the present invention.

FIG. 1 is a schematic block diagram of a power generation system 100. The power generation system includes a power conversion system 102 comprising a power converter 103 and a control unit 104. The control unit 104 is typically packaged with the power converter 103 and is used for controlling the operation of the power converter hardware. The power generation system also includes a detection unit 106 and a variable ramp rate generation unit 108. In one embodiment, the detection unit 106 obtains a value of a line parameter at a point of common coupling (PCC) 110 and determines a first variation value in the line parameter for use in identifying a potential islanding condition. The line parameter may comprise one or more of a voltage, current, frequency, impedance or other equivalent electrical parameter, for example, and the value may be obtained or measured by a PCC sensor 109 in one embodiment. The PCC sensor as used herein may comprise a sensor for obtaining a line parameter value at a point of common coupling. The PCC sensor may include a voltage, current, impedance, frequency or other equivalent electrical measuring device.

The variable ramp rate generation unit 108 is configured for ramping up an amount of reactive power (Q), active power (P), or a combination of active and reactive power generated from power conversion system and injected into a grid 122 in response to the potential islanding condition, when identified. Conventional power components such as transformers and filters may be present between the power converter 103 and the grid 122 with a medium voltage (MV) transformer 120 being illustrated in FIG. 1 for purposes of example. In the embodiment of FIG. 1, Q_ref 112 is the reactive power reference and P_ref 114 is the active power reference. One or both of these references are transmitted to control unit 104 for determination of the value of reactive power and/or active power to be injected to the grid 122. In one non-limiting example if the value of Q_ref 112 is zero, the power conversion system 102 injects zero reactive power to the grid 122. In some embodiments wherein zero reactive power is injected during normal operating conditions, there may be some reasons, unrelated to the islanding detection method described herein, for temporarily injecting reactive power such as, for example, to provide grid support under transient conditions.

The combination of the detection unit 106 and the variable ramp rate generation unit 108 may be embodied in a supervisory control and data acquisition (SCADA) system 116. The power generation system may further include a relay 118 which is configured to shut down the power conversion system 102 feeding the grid 122 during an actual islanding condition. The detection unit 106, the variable ramp rate generation unit 108, and the relay 118 may either comprise separate elements as shown for purposes of example or may be integrated into the control unit 104 if desired. In one exemplary embodiment, the power generation system 100 may further include a power converter sensor 124 for measuring a value of a line parameter at the output of the power converter 103. In one embodiment the power converter 103, control unit 104 and power converter sensor 124 can be integrated into the housing (not shown) of the power conversion system 102.

Figure 2:
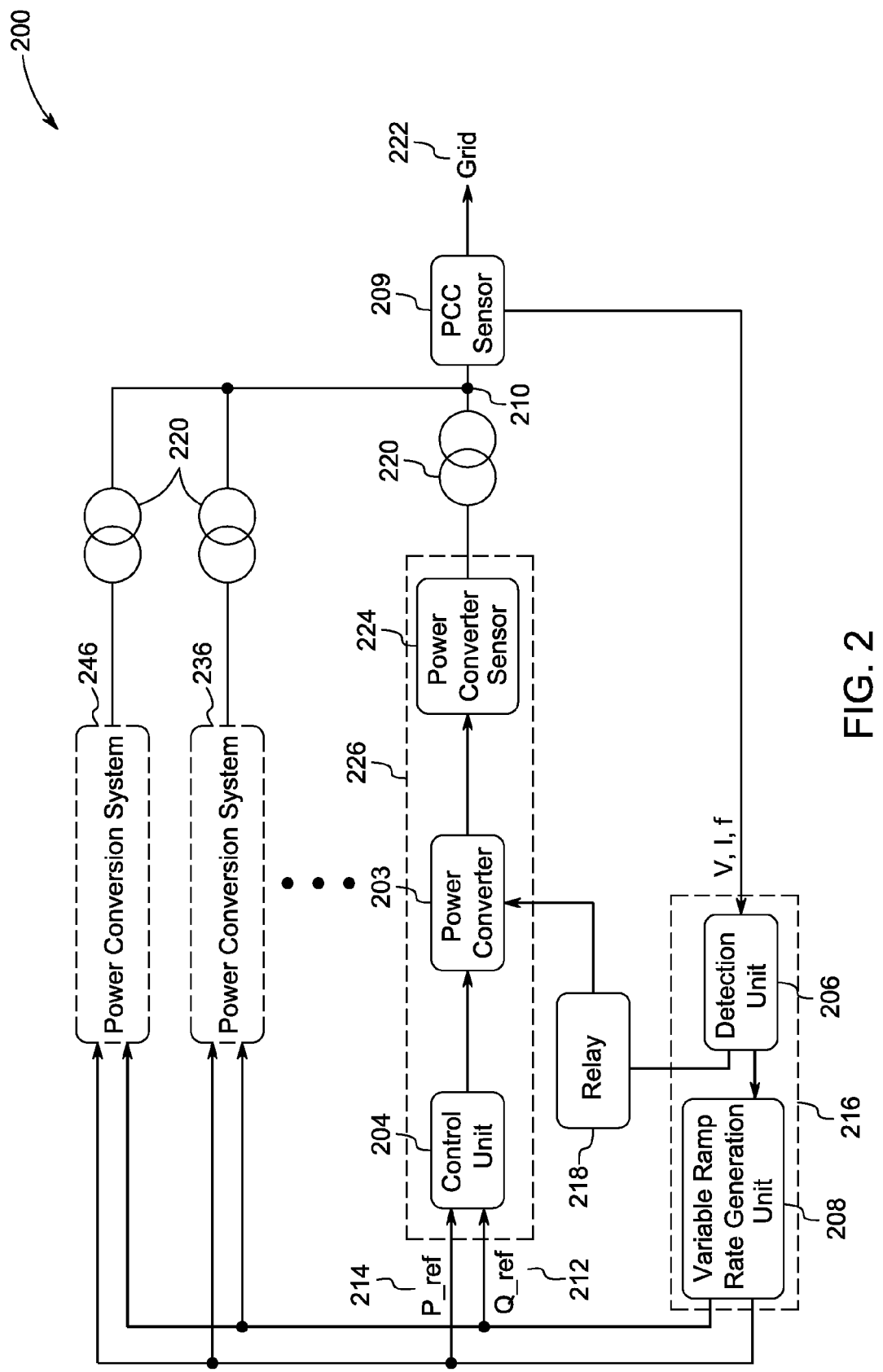
FIG. 2 is a block diagram representation of an exemplary embodiment of a system with a plurality of power conversion systems connected in parallel according to aspects of the present invention.

FIG. 2 is a schematic block diagram of a power generation system 200 with a plurality of power conversion systems 226, 236, and 246 connected in parallel. The elements referenced by numerals 203 through 224 of FIG. 2 correspond to elements referenced by numerals 103 through 124 of FIG. 1. In one embodiment, when the power conversion systems are connected in parallel, each power converter sensor 224 measures the value of the line parameter at the output of each power conversion system 226 and sends the individual line parameter values to detection unit 206. For coordinated control, if desired, variable ramp rate generation unit 208 may then transmit a common power ramp control signal to the power conversion system such that, upon detection of a potential islanding condition each power conversion system injects a substantially equal amount of reactive power, active power or a combination of active and reactive power to the grid 222. In an exemplary embodiment of the present invention, "substantially equal" as used herein refers to an equal value of amount of power with a tolerance limit of ±10%.

As used herein the "potential islanding condition" in a grid refers to an either an actual islanding condition or a grid disturbance. A temporary grid disturbance may occur as a result of deviation in grid impedance or grid voltage, for example. Such grid disturbances can result in false alarms. An actual islanding condition refers to a condition in which a distributed generation (DG) system continues to feed power even though the electric grid is no longer coupled to the energy source.

Figure 3:
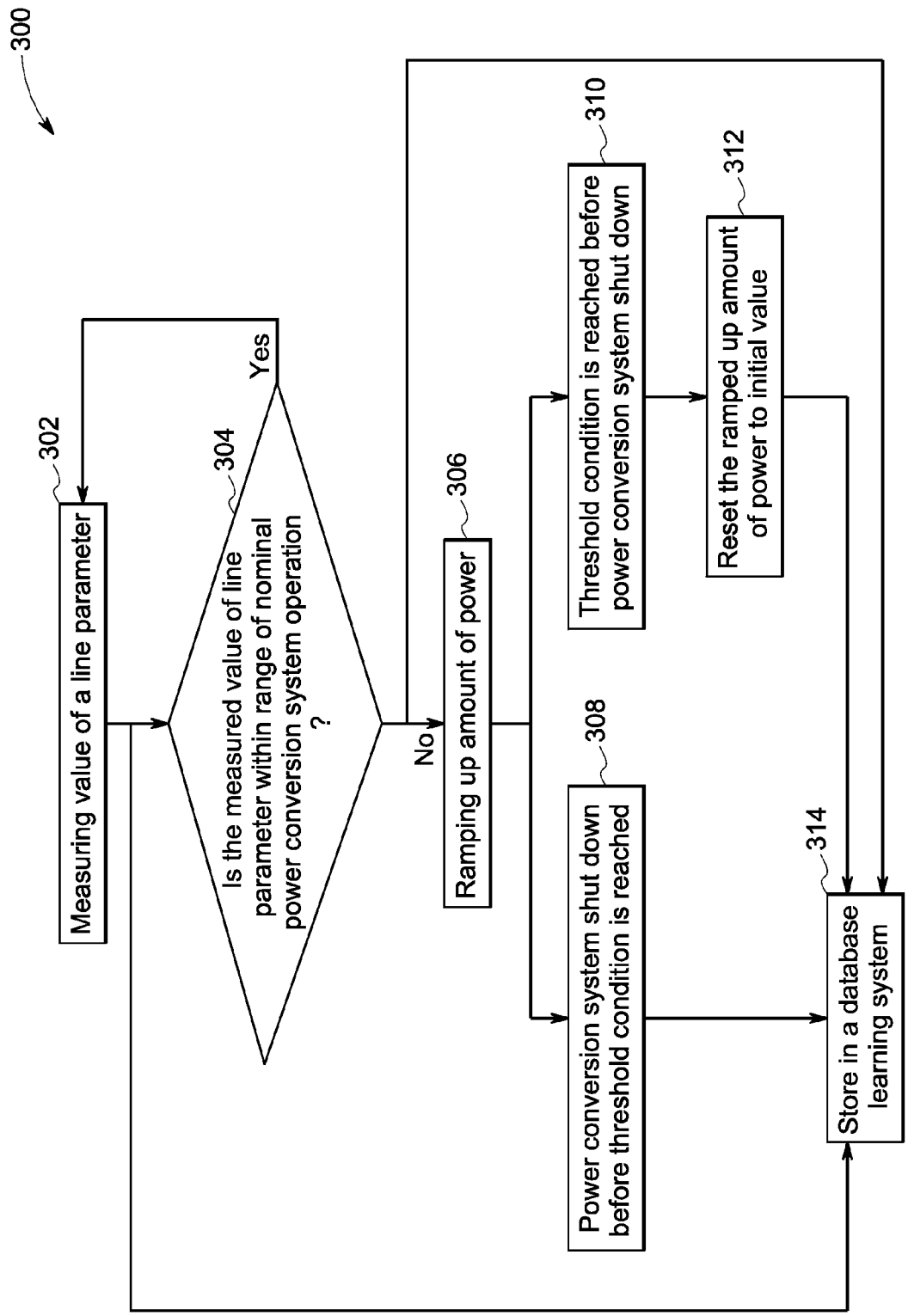
FIG. 3 is a flow chart representation of an exemplary embodiment of a method according to aspects of the present invention.

FIG. 3 is a flow chart 300 representing a method for detecting a potential islanding condition and then identifying an actual islanding condition. In one embodiment, the method of identifying the actual islanding condition is carried out by the SCADA system shown in FIGS. 1 and 2. A measurement of a value of a line parameter may be obtained at the point of common coupling PCC at step 302. In one embodiment, this measurement is taken continuously and, in step 304, it is determined whether the measured value is within a range of nominal power conversion system operation. The term "range of nominal power conversion system operation" as used herein may include a point limit, an upper limit, and/or a lower limit of voltage, current, frequency, impedance, or other equivalent electrical parameter for nominal power conversion system operation. A first variation value of the line parameter from the range of nominal power conversion system operation may be determined and be indicative of the potential islanding condition. In one non-limiting example, if the measured value of the line parameter is frequency, then it would be compared with a corresponding range of frequency or a point value of frequency for nominal power conversion system operation for determining the first variation value respectively from the range or the point value of frequency for nominal power conversion system operation. In some embodiments the range of nominal power conversion system operation may comprise a range with two integer endpoints, a single point value, or two endpoints that are not integers.

If the line parameter value indicates that there is nominal power conversion system operation, then the process returns to step 302 for continued measurement. In one exemplary embodiment of the present invention, even after the identification of the potential islanding condition the measurement of the line parameters is continued in parallel with the ramping procedure described below.

With continued reference to FIG. 3, upon identification of the potential islanding condition, the amount of active power, reactive power or a combination of active and reactive power is ramped up at step 306 by a variable ramp rate generation unit, such as unit 108 of FIG. 1 or 208 of FIG. 2. The ramping is performed until a threshold condition is reached or the power conversion system is shut down, whichever occurs earlier. In an exemplary embodiment the threshold condition comprises a predetermined time period based on the standards and codes imposed on distributed generation for an anti-islanding protection requirement. In a non-limiting example, in accordance with the standards specified in IEEE 1547, the anti-islanding protection requirement is 2 seconds. In another embodiment, the threshold condition comprises a voltage, current, frequency, impedance, reactive power, or active power threshold, for example.

In one embodiment the line parameter and/or first variation value may be used when setting the ramp rate. The ramping waveform of amount of active power, reactive power or a combination of active and reactive power, in one embodiment, can be illustrated by a mathematical function. Such functions include a polynomial function, an exponential function, a parabolic function, a linear function or any other equivalent mathematical function. The amount of power ramped up is such that the ramping up may be at a constant ramp rate or a varying ramp rate. For example, in some embodiments, the varying ramp rate may include a progressively increasing ramp rate or a progressively decreasing ramp rate or a combination of segments of progressively increasing and decreasing ramp rates. In one specific embodiment, reactive power is not injected (that is, reactive power of zero value is injected) under normal operating conditions, and, upon the identification of the potential islanding condition, ramping of reactive power starts from zero.

In one embodiment (not shown in the flowchart FIG. 3), while ramping up the amount of reactive and/or active power, a detection unit, such as unit 106 of FIG. 1 or 206 of FIG. 2 compares the value of the line parameter measured by the PCC sensor, to a trip range and it is determined whether there is a second variation value in the line parameter obtained at the point of common coupling (PCC) from the trip range. The "trip range" as used herein includes a range defined by an upper limit and/or a lower limit of voltage, current, frequency, impedance or other equivalent electrical parameter for tripping of power conversion system. On identification of the second variation value by the detection unit, the relay, shown as 118 of FIG. 1 or 218 of FIG. 2 is triggered to shut down the power conversion system.

With continued reference to FIG. 3, if the power conversion system is shut down before reaching the threshold condition as shown in step 308, it is interpreted as being indicative of an actual islanding condition. The shutdown of the power conversion system results in shutting down the ramping up of the amount of power and other systems associated with the power conversion system. If the threshold condition is reached before the shutdown of the power conversion system as in step 310, then the status is interpreted as not being indicative of an actual islanding condition. At this point, the ramped up amount of power may be reset to an initial value as in step 312 (that is, the values of reactive and active power may be returned to their original values prior to the initiating of the ramp). Thereafter, the measurement of the line parameter values may be continued at 302 for determining any subsequent potential islanding condition.

With continued reference to FIG. 3, in the exemplary embodiment of the present invention, information such as measured line parameter values, first variation value of line parameters, profiles of ramping up an amount of power and corresponding results of ramping up the amount of active power, reactive power or a combination of active and reactive power may be stored at step 314 in a database learning system as a look up value for example. The "corresponding result of ramping up the amount of power" as used herein refers to information such as whether and how quickly the power conversion system was shut down or whether the threshold condition was reached prior to the power conversion system being shut down. The database learning system may include a memory unit loaded with a software algorithm along with the look up value. The term "look up value" as used herein is looked up for making a decision during each subsequent potential islanding condition. In a non-limiting example the decision includes whether to initiate an immediate shut down of power conversion system, whether to initiate the ramping, and, if so, the profile of ramping. In one specific embodiment, the look up value comprises past line parameter values, past ramping profiles, and corresponding past results from the ramping, and the past results are used to adjust present ramping profiles.

In one embodiment the ramping up of the amount of power may be done based on an empirical testing depending on reaction of the grid to the ramping up of amount of power. In another embodiment the decision on the ramping up can be taken based on a look up value stored in a database learning system. In another embodiment the ramping up can be done offline or in a close loop condition.

The database learning system could also or alternatively include an artificial neural network based system or a fuzzy logic based system for example. The memory unit may include RAM, ROM and the equivalents thereof. The database learning system may be used to adjust the envelope for nominal operation, if desired. In this way, the database learning system keeps learning, updating, and adapting itself to the grid conditions. In one embodiment of the present invention, the database learning system is employed within the SCADA System 116 of the power generation system shown in FIG. 1.

Figure 4:
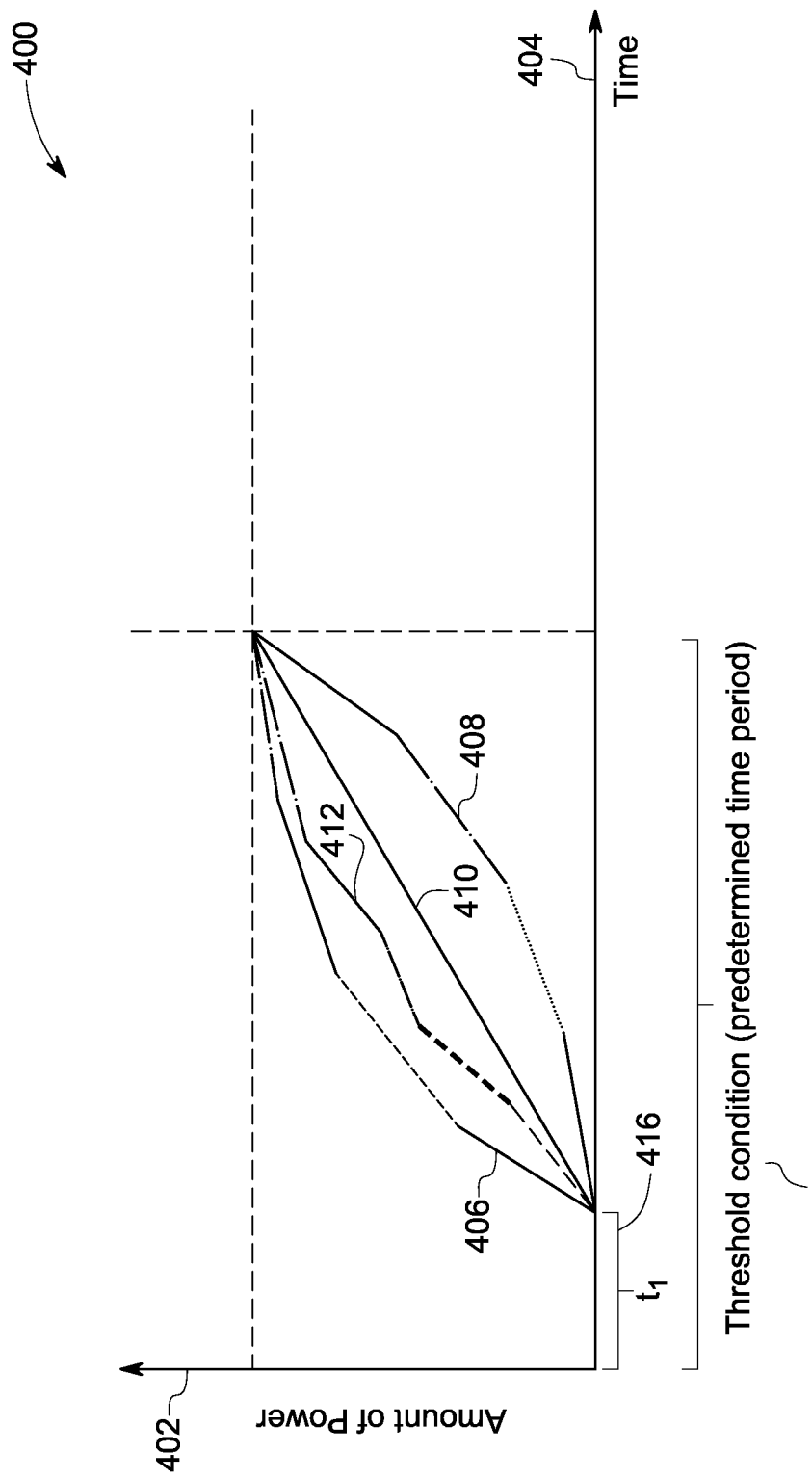
FIG. 4 is a representation of exemplary embodiments of ramping up an amount of power with respect to time according to aspects of the present invention.

FIG. 4 is a pictorial representation 400 of a simulation of an amount of power 402 on the y-axis and time 404 on the x-axis. For example, the amount of power can be ramped up at a progressively decreasing ramp rate as illustrated by ramp profile 406, a progressively increasing ramp rate as illustrated by ramp profile 408, a constant ramp rate as illustrated by ramp profile 410 or a combination of progressively increasing and progressively decreasing ramp rate as illustrated by profile 412. The acceptable threshold condition 414 as represented in this figure is a predetermined time period. The amount of power as illustrated in FIG. 4 is ramped up from an initial value. In one embodiment, the initial value of an amount of reactive power is zero, and the initial value of an amount of active power is non-zero.

With continued reference to FIG. 4, the amount of power is ramped up after a time $t_1$ 416, where $t_1$ varies from zero to a predefined time for satisfying the fault ride through requirement time according to the different standards and grid codes. The "fault ride through" as used herein may include low voltage ride through (LVRT), zero voltage ride through (ZVRT), or high voltage ride through (HVRT), for example. The time $t_1$ need not be a fixed value and may, for example, be adjustable according to the value of the line parameter.

In a non-limiting example of FIG. 4, the threshold condition 414 comprises a predetermined time period. In an alternative embodiment of the present invention, the threshold condition may comprise a predetermined value of voltage, current, frequency, impedance, reactive power, active power, a combination of active or reactive power and other equivalent parameters.

Figure 5:
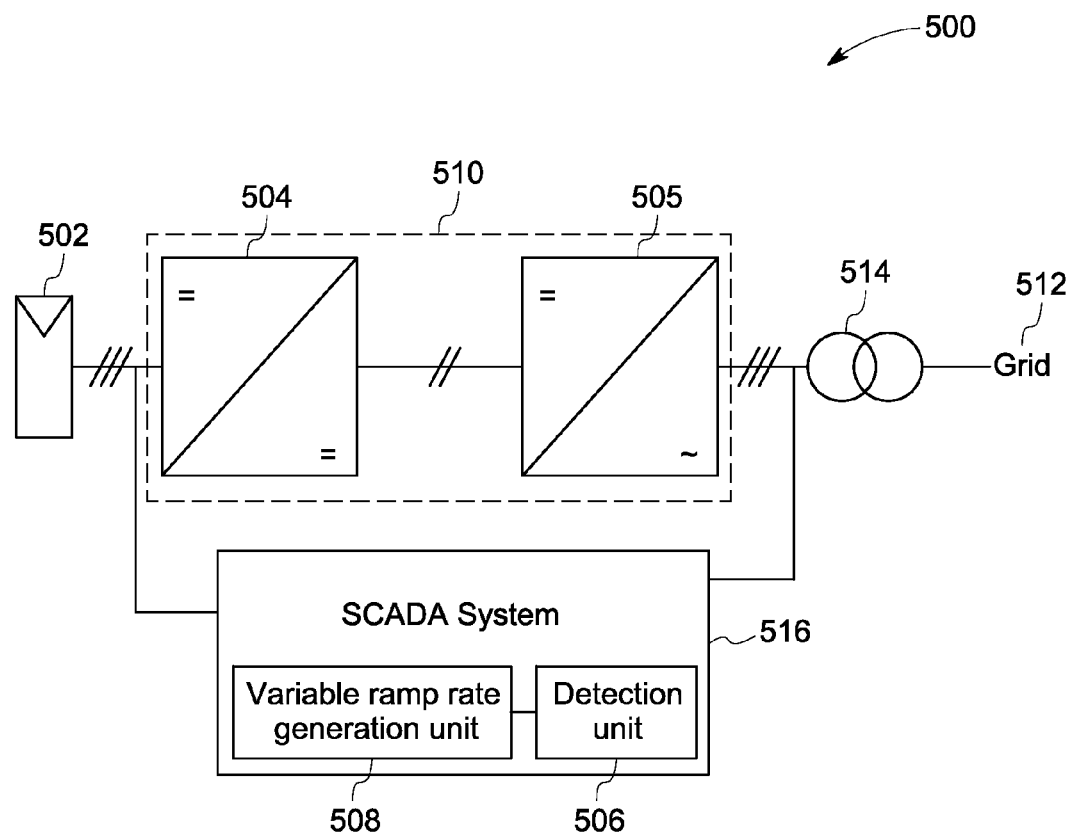
FIG. 5 is a representation of an exemplary embodiment of a solar dual stage power generation system.

FIG. 5 is a block diagram 500 of a solar dual stage power generation system including a solar panel 502 coupled to a dual stage power conversion system 510, which is in turn coupled to a grid 512 through a medium voltage (MV) transformer 514. The dual stage power conversion system includes a DC to DC converter 504 and a DC to AC converter 505 packaged with a control unit (such as shown in FIG. 1 and FIG. 2) for the converter and the inverter. The dual stage power conversion system injects an amount of power to the grid 512. In one embodiment of the present invention multiple dual stage power conversion systems may be connected in parallel. The dual stage power conversion system as mentioned here can be connected to a SCADA system 516 for detection of an actual islanding condition and shutting down the dual stage power conversion system in the event of an actual islanding condition. The SCADA system 516 as used herein corresponds to the SCADA system of FIG. 1 or FIG. 2 with detection unit 506 and variable ramp rate generation unit 508. In other examples, the power generation system may comprise a wind power generation system, a hydrokinetic power generation system, or any other equivalent renewable power generation system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method comprising:
   detecting a potential islanding condition in a grid; and
   in response to the detected potential islanding condition, ramping up an amount of reactive power, active power, or a combination of active and reactive power that is generated from a power conversion system until the earlier of the power conversion system shutting down or a threshold condition being reached.

2. The method of claim 1, wherein detecting the potential islanding condition comprises obtaining a line parameter value.

3. The method of claim 2, wherein the line parameter value and a corresponding result of ramping up the amount of reactive power, active power, or a combination of active and reactive power is stored in a database learning system.

4. The method of claim 2, wherein the line parameter value comprises a voltage, a current, a frequency, an impedance, or combinations thereof.

5. The method of claim 1, wherein ramping up comprises ramping up with a varying ramp rate.

6. The method of claim 5, wherein the varying ramp rate comprises a progressively increasing ramp rate.

7. The method of claim 1, further comprising, if the threshold condition is reached, resetting the amount of reactive power, active power, or the combination of active and reactive power.

8. The method of claim 1, wherein the threshold condition comprises a predetermined time period.

9. The method of claim 1, wherein a zero amount of reactive power is injected during normal operating conditions of the power conversion system, and wherein ramping up the amount of reactive power, active power, or a combination of active and reactive power comprises ramping up an amount of reactive power from zero.

10. A grid protection system comprising:
    a detection unit for detecting a potential islanding condition in a grid; and
    a variable ramp rate generation unit for, upon detection of a potential islanding condition, ramping up an amount of reactive power, active power, or a combination of active and reactive power that is generated from a power conversion system until the earlier of the power conversion system shutting down or a threshold condition being reached.

11. The system of claim 10, further comprising a sensor for obtaining a line parameter value at a point of common coupling for use by the detection unit for detecting the potential islanding condition.

12. The system of claim 10, further comprising a database learning system for storing past line parameter values and corresponding past results from the ramping, wherein the past line parameter values and the corresponding past results from the ramping are used to adjust a present ramping profile.

13. The system of claim 10, further comprising a relay for shutting down the power conversion system when a line parameter value deviates from a trip range.

14. A solar power generation system comprising:
    a power converter for receiving power from a solar power source;
    a detection unit for measuring a line parameter value and using the line parameter value for identifying a potential islanding condition in a grid fed by the a power converter; and
    a variable ramp rate generation unit for ramping up an amount of reactive power, active power, or a combination of active and reactive power generated from the power converter in response to an identified potential islanding condition.

15. The system of claim 14, wherein the solar power generation system is configured for injecting zero reactive power during normal operating conditions of the power conversion system, and wherein the variable ramp rate generation unit is configured for ramping up the amount of reactive power from zero in response to the identified potential islanding condition.

16. The system of claim 14, wherein the line parameter value comprises a voltage at a point of common coupling.

17. The system of claim 14, further comprising a database learning system wherein the line parameter value and a corresponding result of ramping up the amount of reactive power, active power, or a combination of active and reactive power are stored in the database learning system.

18. The system of claim 14, wherein the line parameter value comprises a voltage, a current, a frequency, an impedance, or combinations thereof.

19. The system of claim 14, wherein the power converter comprises a plurality of power converters and wherein the variable ramp rate generation unit is coupled for transmitting a common power ramp control signal to the plurality of power converters.

* * * * *